United States Patent
Moffatt et al.

(10) Patent No.: US 8,442,137 B2
(45) Date of Patent: *May 14, 2013

(54) SYSTEM AND METHOD FOR REDUCING PEAK-TO-AVERAGE POWER RATIO FOR MULTI-CARRIER COMMUNICATION SYSTEMS

(75) Inventors: Christopher Douglas Moffatt, Palm Bay, FL (US); Ray J. Kolar, Grant, FL (US); Charles W. Richards, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/351,738

(22) Filed: Jan. 17, 2012

(65) Prior Publication Data

US 2012/0114074 A1    May 10, 2012

Related U.S. Application Data

(60) Continuation of application No. 12/905,809, filed on Oct. 15, 2010, now Pat. No. 8,135,081, which is a continuation of application No. 12/574,386, filed on Oct. 6, 2009, now Pat. No. 7,822,136, which is a division of application No. 10/690,613, filed on Oct. 23, 2003, now Pat. No. 7,639,747.

(51) Int. Cl.
*H04L 27/28* (2006.01)

(52) U.S. Cl.
USPC .......................................... 375/260; 375/296

(58) Field of Classification Search .................. 375/259, 375/260, 286, 296, 297
See application file for complete search history.

(56) References Cited

U.S. PATENT DOCUMENTS 5,835,536 A    11/1998    May et al.
5,930,231 A     7/1999    Miller et al.

(Continued)

FOREIGN PATENT DOCUMENTS

JP    8228186 A    9/1996
JP    11215091 A    8/1999

(Continued)

OTHER PUBLICATIONS

Davis, J.A. and J. Jedwab, "Peak-to-Mean Power Control in OFDM, Golay Complementary Sequences and Reed-Muller Codes," HP Laboratories Technical Report, HPL-97-158, Dec. 1997.

(Continued)

*Primary Examiner* — David B. Lugo
(74) *Attorney, Agent, or Firm* — Duane Morris LLP

(57) ABSTRACT

The present disclosure presents a predictive signal producing method that effectively levels transmitter output power in a multi-carrier communication system and results in approaching amplifier performance normally associated with constant carrier waveforms. Embodiments of the disclosed solution offers >10 dB reduction in the peak-to-average power required to support the transmission of, for example, orthogonal frequency division modulation ("OFDM") modulation techniques. Embodiments of the novel system and method maximize peak-to-average power ratio ("PAPR") reduction with selective mapping and soft clipping, which may include filtering, combined. This novel approach also minimizes overhead, bit error rate, retransmissions, and increases latency as well as implementing processing cycles with a number of iterations. The disclosed system and method improves the total system DC power efficiency and provides an optimal solution for PAPR reduction in multi-carrier communication systems such as, for example, OFDM.

13 Claims, 7 Drawing Sheets

U.S. PATENT DOCUMENTS

| | | | |
|---|---|---|---|
| 6,130,918 | A | 10/2000 | Humphrey et al. |
| 6,157,619 | A | 12/2000 | Ozluturk et al. |
| 6,181,714 | B1 | 1/2001 | Isaksson et al. |
| 6,597,746 | B1 | 7/2003 | Amrany et al. |
| 6,925,128 | B2 | 8/2005 | Corral |
| 6,950,389 | B2 | 9/2005 | Weerackody |
| 7,254,180 | B1 | 8/2007 | Oelcer |
| 7,639,747 | B2 | 12/2009 | Moffatt et al. |
| 7,822,136 | B2 | 10/2010 | Moffatt et al. |
| 8,135,081 | B2 * | 3/2012 | Moffatt et al. ............... 375/260 |
| 2002/0150036 | A1 | 10/2002 | Weerackody |
| 2002/0168016 | A1 | 11/2002 | Wang et al. |
| 2003/0099302 | A1 | 5/2003 | Tong et al. |
| 2004/0086054 | A1 | 5/2004 | Corral |
| 2004/0141548 | A1 | 7/2004 | Shattil |
| 2004/0146115 | A1 | 7/2004 | Feng et al. |

FOREIGN PATENT DOCUMENTS

| | | |
|---|---|---|
| JP | 2003298549 A | 10/2003 |
| WO | 02/056516 A1 | 7/2002 |

OTHER PUBLICATIONS

Pinto, J.L. and I. Darwazeh, "Phase Distortion and Error Vector Magnitude for 8-PSK Systems," Department of Electrical Engineering and Electronics, UMIST.

Farhang-Boroujeny, B., et al., "Fast Estimation in BER in PAR-Limited DMT Systems," IEEE Global Telecommunications Conference Proc., NY, NY, Nov. 17-21, 2002, pp. 569-573.

Japanese Patent Office, Refusal Action mailed Oct. 21, 2008 Japanese Application No. 2006-536684, 3pgs.

* cited by examiner

SYSTEM AND METHOD FOR REDUCING PEAK-TO-AVERAGE POWER RATIO FOR MULTI-CARRIER COMMUNICATION SYSTEMS

RELATED APPLICATIONS

This application is a continuation and claims priority of co-pending U.S. patent application Ser. No. 12/905,809 entitled "System and Method for Reducing Peak-to-Average Power Ratio for Multicarrier Communication Systems" filed Oct. 15, 2010 which itself is a continuation of and claims priority of co-pending U.S. patent application Ser. No. 12/574,386 entitled "System and Method for Reducing Peak-to-Average Power Ratio for Multicarrier Communication Systems" filed Oct. 6, 2009 which issued as U.S. Pat. No. 7,822,136 on Oct. 26, 2010, which itself is a divisional of and claims priority of U.S. patent application Ser. No. 10/690,613 entitled "System and Method for Reducing Peak-to-Average Power Ratio for Multicarrier Communication Systems" filed on Oct. 23, 2003 and issued as U.S. Pat. No. 7,639,747 on Dec. 29, 2009, the entirety of each is herein incorporated by reference.

BACKGROUND

The peak-to-average power ratio ("PAPR"), also known as peak-to-mean power ratio ("PMPR") or peak factor, is an important characteristic of multi-carrier transmitted signals. The peak of the signal can often be N times greater than the average power level. These large peaks cause intermodulation distortion which can result in an increase in the error rate. These distortions are brought about from the limitations inherent in a transmitting amplifier.

In order to prevent the transmitter amplifier from limiting (clipping), the average signal power must be kept low enough to keep the signal relatively linear through the amplifier. In order to transmit a high power signal, a high power amplifier is required which requires a large DC system power. A much higher power amplifier is required to transmit multi-carrier waveforms than for constant envelope waveforms. For example, using 64 carrier waveforms, a 40 dBm power amplifier would require about 15 dB of back off. Therefore, instead of operation at 40 dBm (10 watts) the amplifier is only capable of operating at 25 dBm (0.316 Watts). Thus in order to transmit at the desired 40 dBm, a 55 dBm (316 Watt) amplifier would be required. The associated power supply, power consumption, can be substantially increased. In addition, such large power requirements lead to associated increased space demands and heat dissipation requirements.

With the large amount of interest and activity with Orthogonal Frequency Division Modulation ("OFDM"), and in particular 802.11a and 802.11g communication technology, the PAPR problem is exaggerated. 802.11 with its use of complex waveforms requires highly linear RF amplifiers. Current 802.11 physical layer integrated circuits have not implemented PAPR reduction schemes. In particular, multi-tone OFDM typically requires greater than 10 dB power amplifier back-off because of a high peak-to-average power ratio. The net result of these factors is an increased DC power demand beyond that encountered with other 802.11 techniques. The effect may be less noticeable for short duty cycle signals, but can be significant for situations requiring continuous transmission of data.

OFDM, as mentioned above, is a method of transmitting data simultaneously over multiple equally-spaced and phase synchronized carrier frequencies, using Fourier transform processing for modulation and demodulation. The method has been proposed and adopted for many types of radio systems such as wireless Local Area Networks ("LAN") and digital audio and digital video broadcasting. OFDM offers many well-documented advantages for multi-carrier transmission at high data rates, particularly in mobile applications. Specifically, it has inherent resistance to dispersion in the propagation channel. Furthermore, when coding is added it is possible to exploit frequency diversity in frequency selective fading channels to obtain excellent performance under low signal-to-noise conditions. For these reasons, OFDM is often preferable to constant envelope modulation with adaptive equalization and is arguably less complex to implement.

The principal difficulty with OFDM, as alluded to above, is that when the sinusoidal signal of the N carriers add mostly constructively, the peak envelope power is as much as N times the mean envelope power. If the peak envelope power is subject to a design or regulatory limit then this has the effect of reducing the mean envelope power allowed under OFDM relative to that allowed under constant envelope modulation. If battery power is a constraint, as is typically the case with portable equipment such as mobile consumer appliances, laptops, and sophisticated Department of Defense communication systems, then the power amplifiers required to behave linearly up to the peak envelope power must be operated inefficiently with considerable back-off from compression. Digital hard limiting of the transmitted signal has been shown to alleviate the problem but only at the cost of spectral sidelobe growth and consequential bit error performance degradation.

FIG. 1 illustrates 16 carriers in-phase with frequencies ranging from C hertz for carrier 101 to 16 C hertz for carrier 116, with the intermediate carriers having increasing frequencies with steps of C, characteristic of an OFDM signal. Each of the carriers as shown have a nominal maximum amplitude of one, however as seen in FIG. 2 the disparate effects of the carriers added in-phase are readily apparent. FIG. 2 shows the large peak amplitudes of the added carriers at around time sample 25 and around time sample 1575.

FIG. 3 illustrates the peak-to-average power ratio of the 16 carriers modulated in-phase. The large peak-to-average power ratios correspond to the large amplitude spikes illustrated in FIG. 2. The peak-to-average power ratio for FIG. 3 is generated according to the function:

$$\frac{P_{peak}}{P_{avg}} = X_i^2 \bigg/ \left(\frac{1}{N}\sum_1^N X_i^2\right)^2$$

where $X_i$ is the signal sample amplitude at sample number i and N is the number of samples of the multi-carrier symbol.

These problems provide a clear motivation to find other solutions for controlling the peak to mean envelope power ratio of the transmitted signal. One solution offered uses block coding to transmit across the carriers only those polyphase sequences with small PAPR; however, this entails an exhaustive search to identify the best sequences and requires large look-up tables for encoding and decoding.

Some techniques, such as spectral whitening, serve to reduce the peak-to-average ratio and allow the use of RF amplifiers closer to their 1 dB compression point, resulting in a decreased DC power demand. Some prior art solutions have used clipping or mapping to reduce the PAPR. However no solutions have employed or suggested a hybrid system, including selective mapping and soft clipping as is presented in this disclosure.

It is an object of the present disclosure to obviate the disadvantages of the prior art and present a novel system and method for reducing the peak-to-average power ratio of a signal for transmission in a multi-carrier communication system. One method sequences information data according to a data vector and modulates multi-carrier symbols with the sequenced data. The resultant modulated data signal's peak-to-average power ratio is measured and compared to a predetermined threshold. In the method, if the peak-to-average power ratio exceeds the predetermined threshold, the data is re-sequenced in accordance with a new data vector and repeats the modulation and comparison processes. Otherwise the modulated data signal is appended with a data map associated with the respective data vector and sampled. Those modulated data signal samples which exceed a predetermined range are clipped and the clipped modulated data signal is filtered, thereby reducing the PAPR ratio of the signal to be transmitted in a multi-carrier communication system.

It is a further object of the present disclosure to present a novel system and method, in a multi-carrier communication system, of transmitting data. An embodiment of a system and method includes sequencing the data according to one or more unique sequences, modulating one or more of the sequences of data and selecting one of the modulated sequences of data, based on the PAPR. The system and method further include filtering the selected modulated sequence of data to remove amplitude peaks outside a threshold band, and transmitting the filtered signal over the multi-carrier communication system.

It is another object of the present disclosure to present in a multi-carrier communication system with a linear amplifier, a novel system and method of preventing limiting of the amplifier. The novel system and method include sequencing data to be transmitted based upon the resultant PAPR from the modulation of the sequenced data. Also included is sampling the modulated sequenced data and truncating the samples which are outside a threshold, thereby forming a data signal that prevents limiting of the amplifier.

It is still another object of the present disclosure to present, in a multi-carrier communication system for transmitting data, a novel system and method for forming a data signal that reduces the required power of a transmitter. The novel system and method includes providing the data to be transmitted in one or more unique sequences and modulating the one or more unique sequences thereby creating one or more unique modulated sequences. The system and method may also include selecting for transmission one of the unique modulated sequences based on its associated PAPR, and truncating amplitudes of the selected sequence which are outside a predetermined range to thereby form a data signal that reduces power required to transmit the signal.

It is yet another object of the present disclosure to present a novel transmitter for transmitting data with multiple carriers. A transmitter may have a modulator for modulating multi-carrier symbols with the data, a processor for measuring the PAPR of the modulated data, and a logic device for comparing the PAPR with a threshold. The transmitter may also have a processor for deterministically re-sequencing the data and an amplitude filter for reducing peaks of the modulated data signal that are outside a predetermined range.

The present disclosure presents a predictive signal producing method that effectively levels transmitter output power, and results in approaching amplifier performance normally associated with constant carrier waveforms of the prior art. This solution offers >10 dB reduction in the peak-to-average power required to support the transmission of OFDM modulation techniques. This approach maximizes PAPR reduction with selective mapping and soft clipping combined. The approach also minimizes overhead, bit error rate, retransmissions, and increases latency as well as implementing processing cycles with a number of iterations. The disclosed approach improves the total system DC power efficiency and provides an optimal solution for PAPR reduction in OFDM and is uniquely different from the prior art.

These and many other objects and advantages of the present disclosure will be readily apparent to one skilled in the art to which the disclosure pertains from a perusal of the claims, the appended drawings, and the following detailed description of the preferred embodiments.

DETAILED DESCRIPTION

Figure 1:
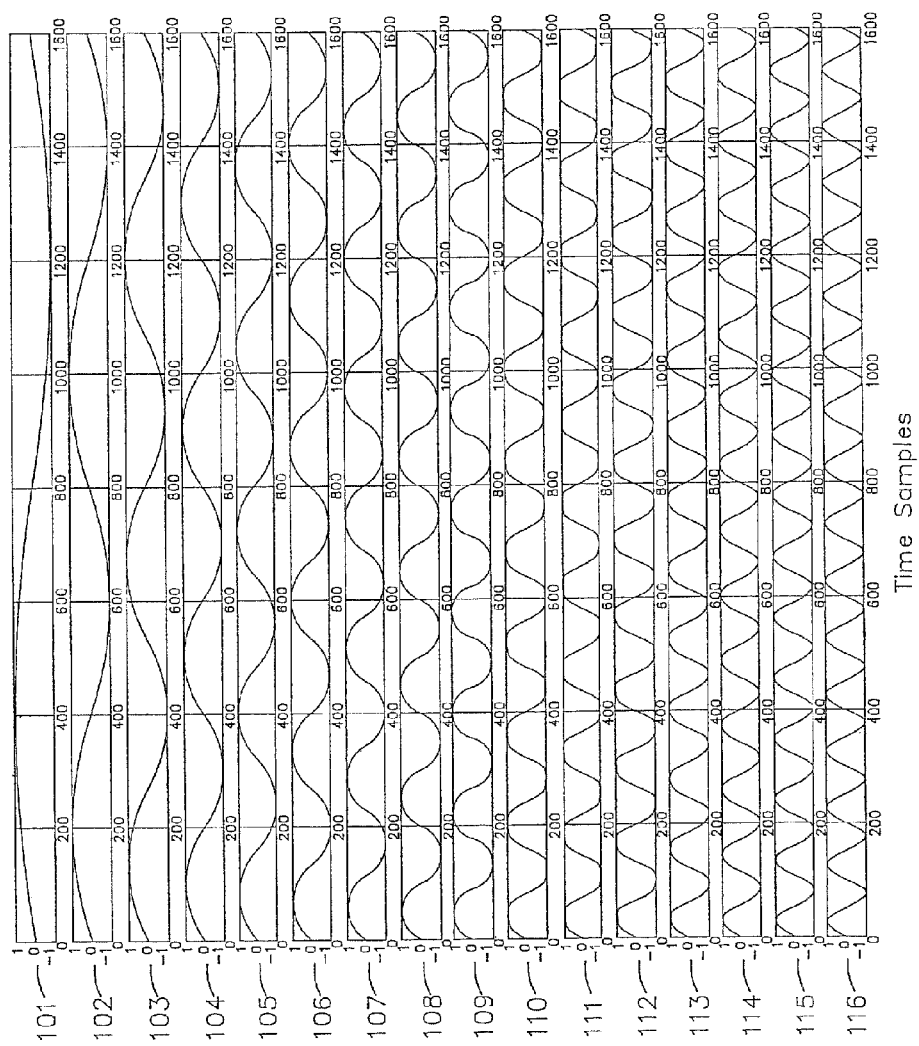
FIG. 1 is a representation of N=16 in-phase carriers typical of an OFDM system.
Figure 2:
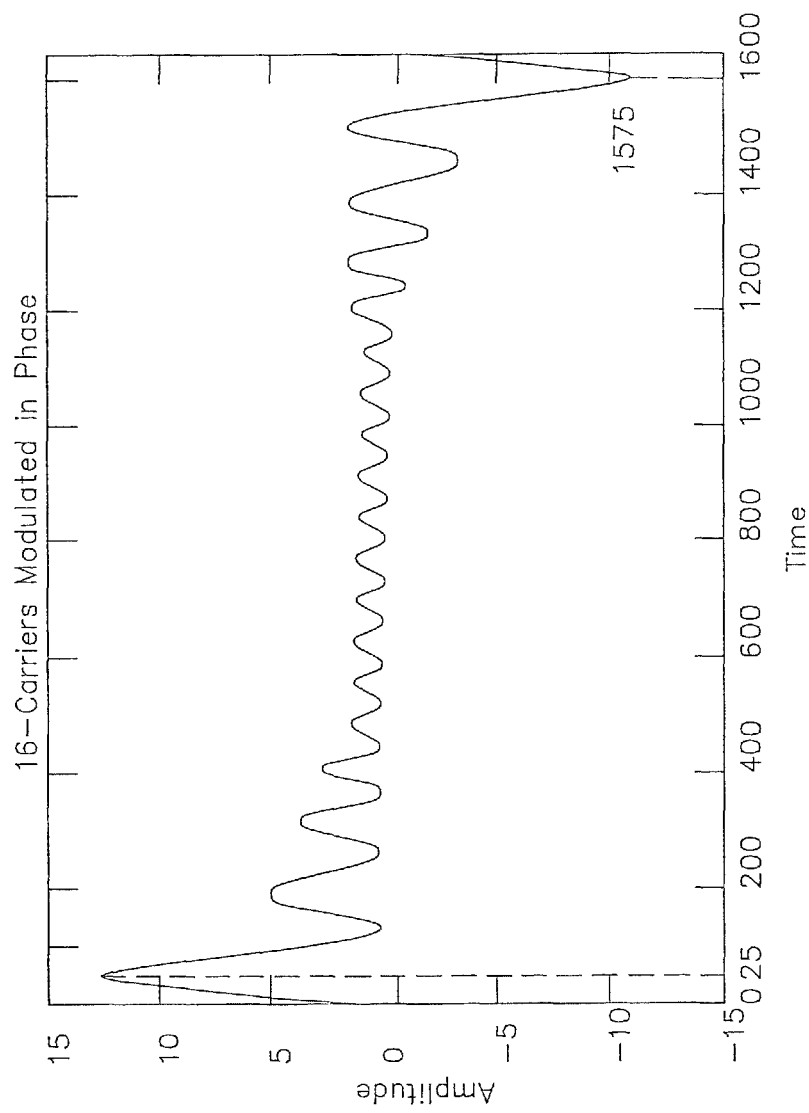
FIG. 2 is a representation of the amplitude vs. time of the carriers of FIG. 1 added in-phase.
Figure 3:
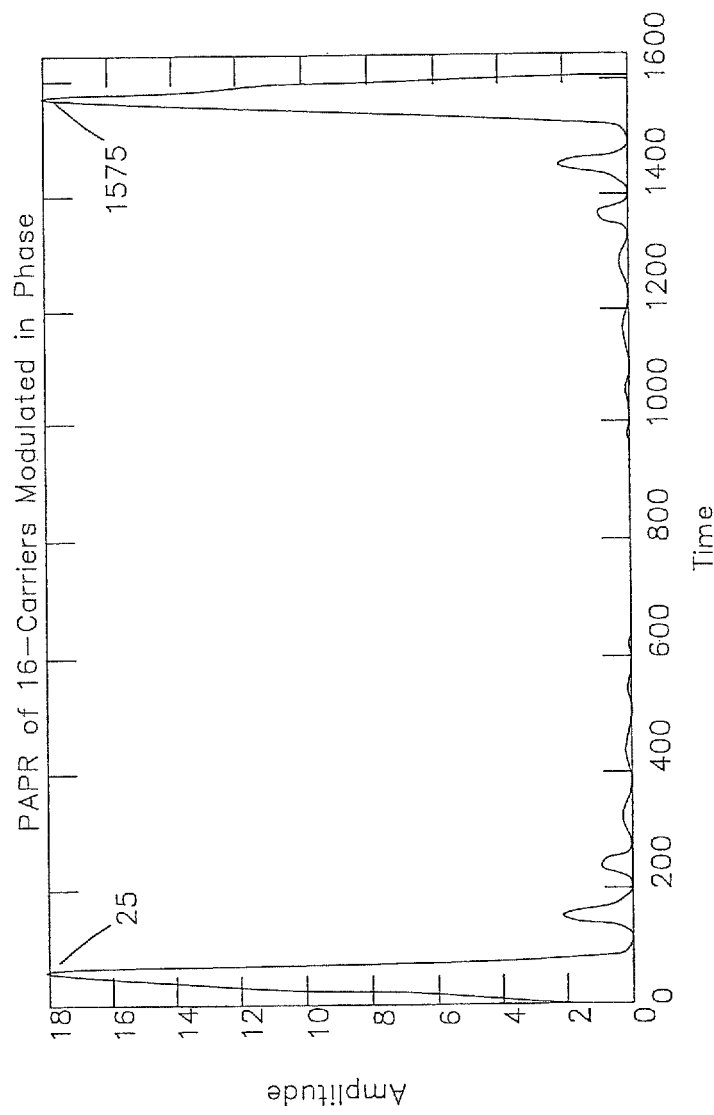
FIG. 3 is a representation of the PAPR of the added carriers vs. time.
Figure 4:
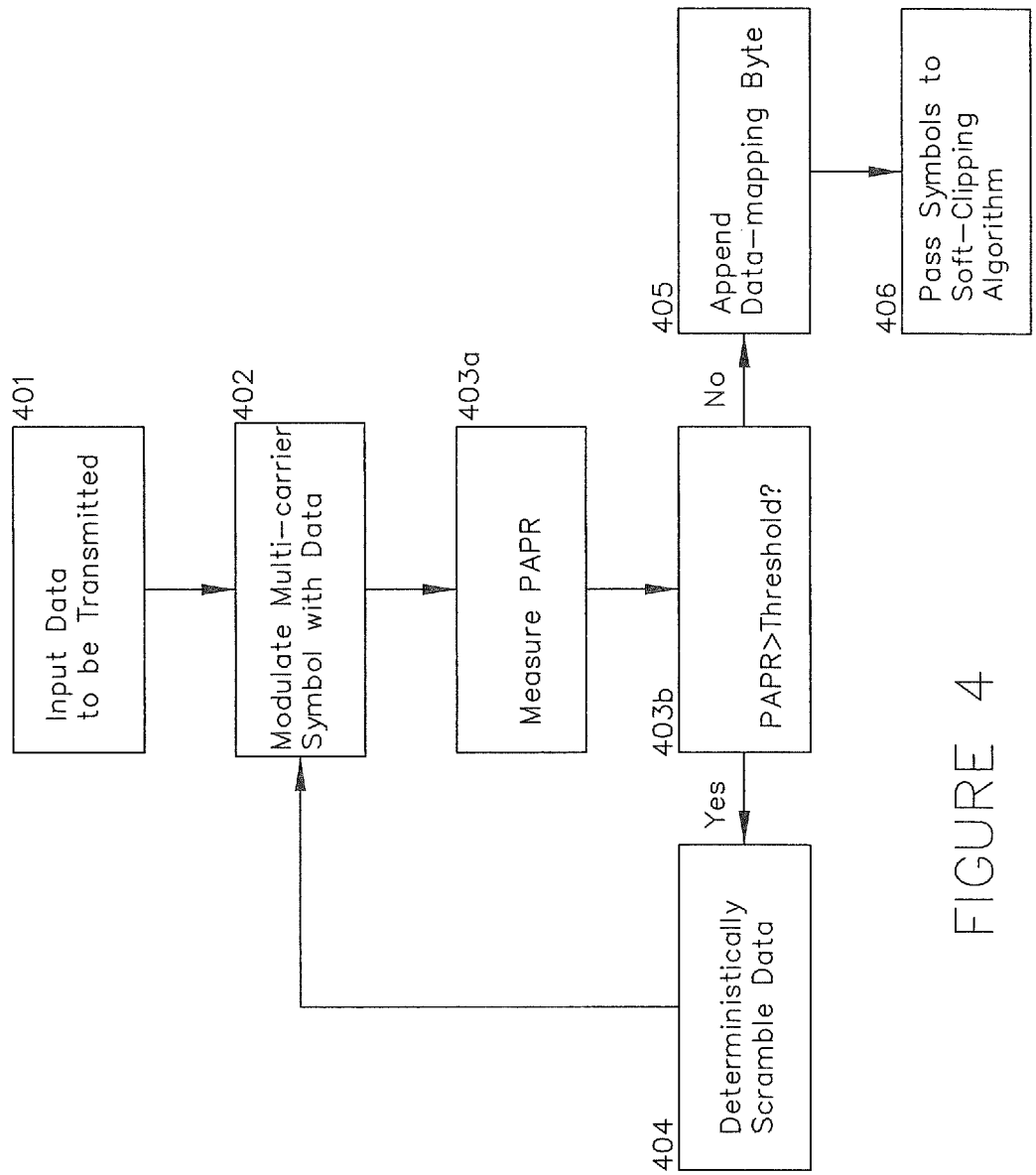
FIG. 4 is an overview of a PAPR reduction system and method according to disclosed embodiments.

An overview of a disclosed embodiment for a method of reducing PAPR is shown in FIG. 4. The data to be transmitted is gathered in block 401. This data contains the information to be transferred from a data source. The data source being a computer, laptop, mobile phone, or appliance or other data generation, relay, input or storage source. The sequence of the data is described in a data vector. In modulator 402, a multi-carrier symbol is modulated with the assembled data. The multi-carrier system preferably being OFDM or other 802.11 multi-carrier systems, however embodiments of other non-802.11 multi-carrier systems are also envisioned.

The resultant PAPR of the modulated carriers containing the sequenced data, which is described with a data vector, is measured in block 403$a$. The measured PAPR is then compared with a predetermined threshold in block 403$b$. The threshold may be, for example, user determined or derived from a regulatory requirement. It is also envisioned that the thresholds may be selected from a look up table or other empirical method. If the measured PAPR of the data vector is above the appropriate threshold, meaning the PAPR is too high, the data is deterministically scrambled (or re-sequenced) in block 404 to create a different data vector, of course the different data vector contains the same data, just with a different or unique sequence. The new scrambled data or data vector is modulated with the multi-carrier symbols in block 402. The PAPR of the new iterative data vector is then again measured. If the PAPR is again above the threshold the data is again deterministically scrambled to create yet another different data vector and continues the process through modulation, measurement and scrambling until the PAPR of the respective data vector is within the threshold. This process is not directed towards obtaining the best sequence but rather directed to obtaining an acceptable sequence. However, if the PAPR is less than the threshold then a data mapping byte(s) descriptive of the data vector, (indicating the scrambled sequence of data) is appended to the modulated data in block 405. The data mapping byte is used to descramble the data on the receiver end. The modulated scrambled data and appended mapping byte is then passed to block 406 which passes the symbols to a soft clipping algorithm.

Figure 5:
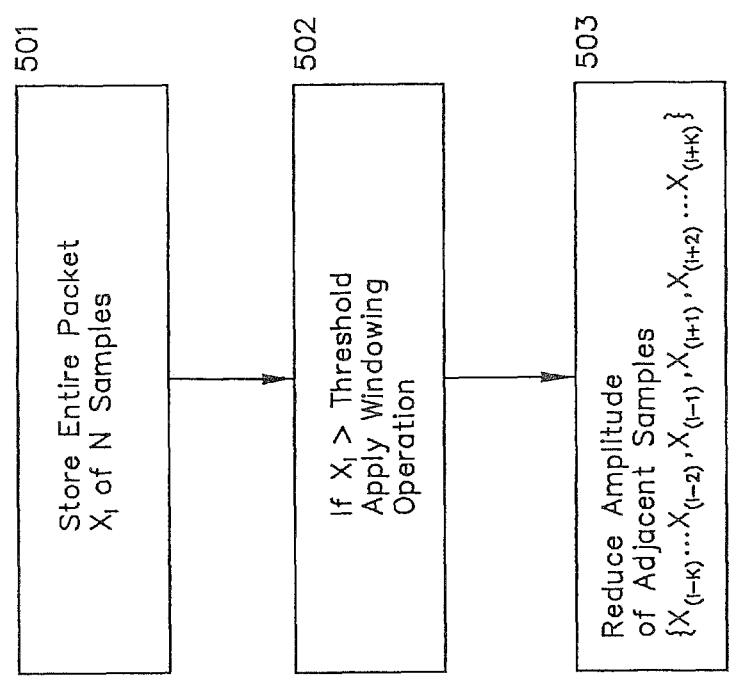
FIG. 5 is an overview of a soft-clipping method according to disclosed embodiments.

With reference now directed to FIG. 5, the entire packet of the modulated data and appended mapping byte is sampled or processed from memory in block 501. The samples $X_i$ are compared to a second threshold as indicated in block 502. If the sample $X_i$ exceeds the threshold, a windowing operation or filtering operation is applied to the packet in which the samples which exceed the threshold are reduced or clipped. In addition to reducing $X_i$, it is also advantageous to reduce adjacent samples $\{X_{(i-K)} \ldots X_{(i-2)}, X_{(i-1)}, X_{(i+1)}, X_{(i+2)} \ldots X_{(i+K)}\}$, where K can be experimentally, theoretically or empirically determined as shown in block 503. The filtering could be a Gaussian-shaped filter, which has the same frequency and time-domain characteristics. The filtering operation, for example, can be implemented as a FIR or IIR, such as $h(n)=\{0.75, 0.5, 0.75\}$. The filtering operation can also be adaptive using a measured parameter of the filter output to adapt the filter operation.

Figure 6:
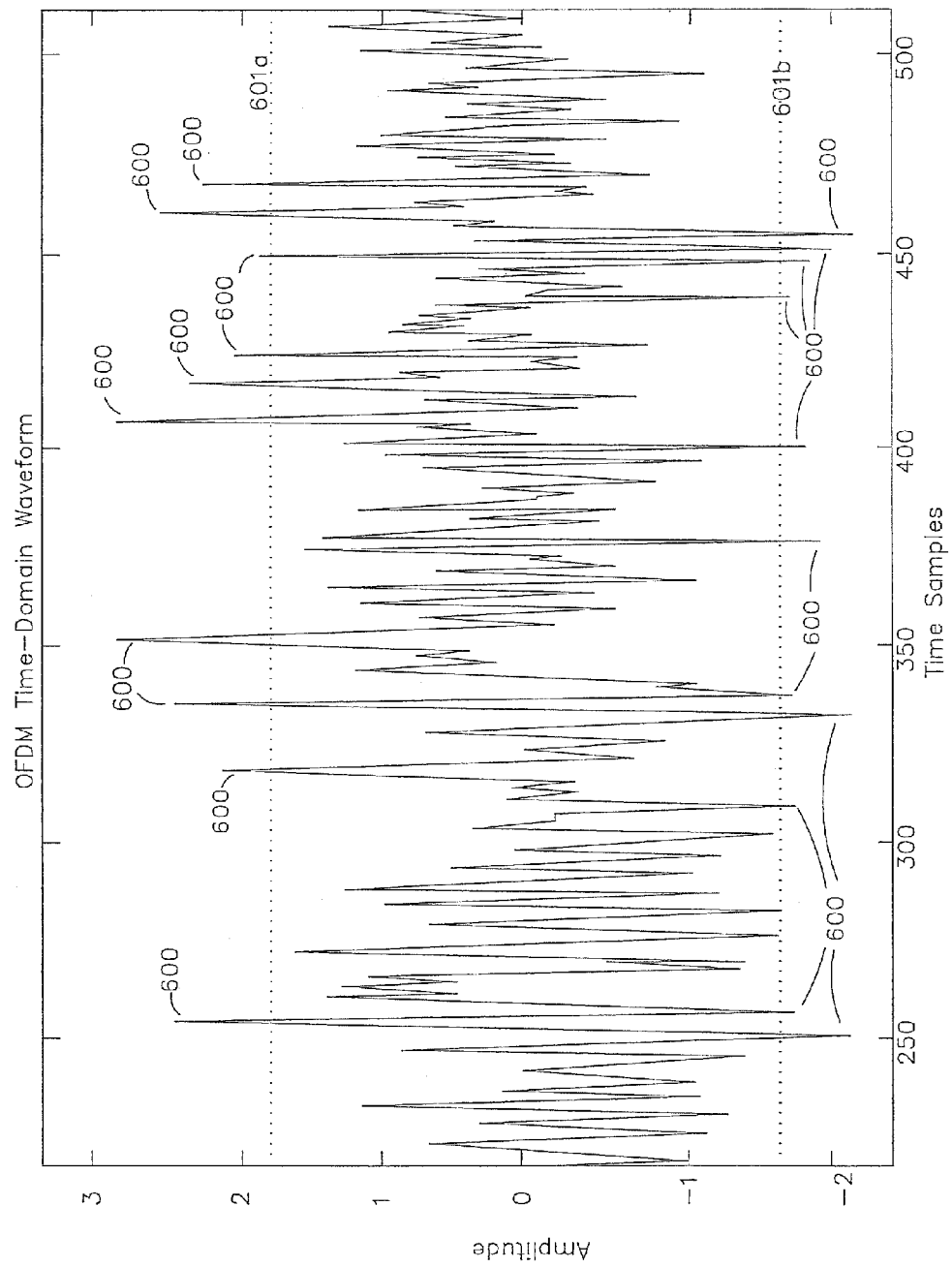
FIG. 6 is a graphical representation of a windowing operation according to disclosed embodiments.

FIG. 6 shows a representative example of the soft clipping algorithm. The second thresholds are shown as the window borders 601a and 601b. Those amplitudes that are above threshold 601a and/or below threshold 601b, labeled collectively as 600, are clipped or truncated by methods known in the art. Thus the soft clipping algorithm filters out peaks above a dynamic threshold.

The result of the soft clipping process may increase out of band noise; however this effect can be ameliorated by a raised cosine filter or other appropriate filter. The second or windowing threshold may be dynamically adjusted based on several factors such as, but not limited to, the measured PAPR of the accepted data vector or may be predetermined by the user. The use of look-up tables for establishing the second threshold is likewise envisioned.

Figure 7:
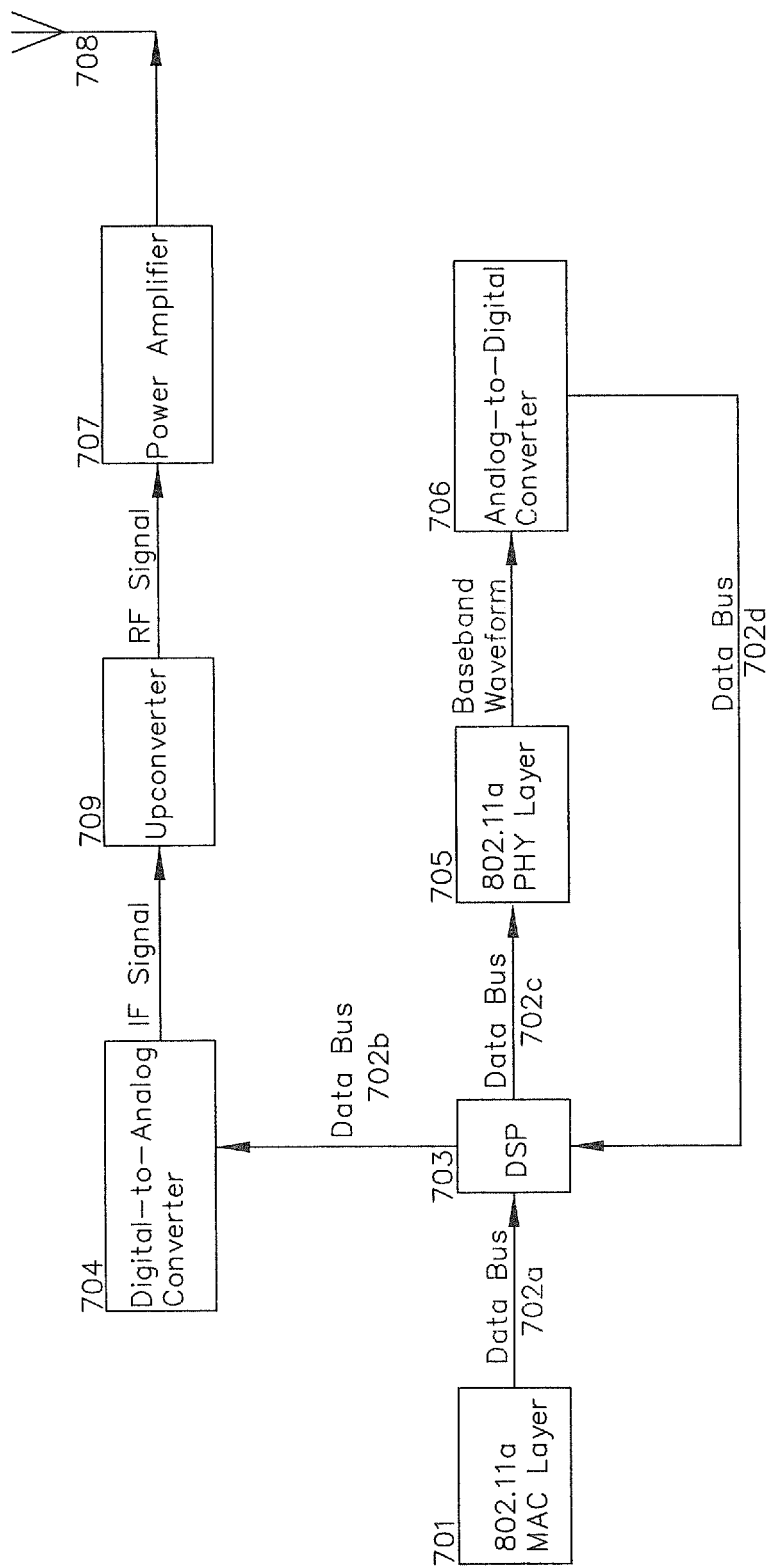
FIG. 7 is an overview of a hardware implementation of disclosed embodiments.

The PAPR method described above is envisioned to be implemented via either hardware or software, or both. A hardware implementation of an embodiment of a PAPR reduction system is shown in FIG. 7. In FIG. 7 the 802.11a MAC layer 701 is connected by a data bus 702a to a digital signal processor 703. The DSP is connected to the digital to analog converter 704 and the 802.11a physical layer 705 by respective data busses 702b and 702c. The physical layer 705 supplied with a baseband or intermediate frequency IF signal to an analog-to-digital ("A/D") Converter 706 which connects back to the DSP by data bus 702d.

The output of the digital to analog Converter 704 supplies an IF signal to the up-converter 709 which generates a radio frequency RF signal, or signal at a frequency applicable to the transmission media, to the power Amplifier 707 which amplifies the signal for transmission over the transmission channel by antenna 708 or by a transducer applicable to the transmission media.

The present disclosure presents a predictive signal-producing algorithm that effectively levels transmitter output power, and results in approaching amplifier performance normally associated with constant carrier waveforms of the prior art. The present disclosure also presents a technique to reduce the PAPR of waveforms produced from a multi-carrier chipset, preferably OFDM or other multi-carrier waveform producing chipsets, by using external methods to the chipset. Prior art requires modification to the actual waveform producing chipset (which is typically not possible) in order to implement PAPR reduction techniques. The technique presented here is unique in that it provides a method to reduce PAPR without modification to the chipset.

While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal hereof.

We claim:

1. In a multi-carrier communication system, a transmitter for transmitting data with multiple carriers, comprising:
   a modulator for modulating multi-carrier symbols with the data thereby creating one or more modulated signals; wherein the data sequence for each of the one or more modulated signals is described by an associated data map signal;
   a processor for measuring a peak-to-average power ratio of the modulated signals;
   a logic device for comparing the peak-to-average power ratio of the modulated signals with a predetermined threshold and for selecting a modulated signal based on the comparison;
   a processor for appending the associated data map signal to selected modulated signal to create a re-sequenced signal; wherein the processor appends the associated data map subsequent to the selection of the modulated signal, and;
   an amplitude filter for reducing peaks of the re-sequenced signal that are outside a predetermined range;
   a sequencing processor for sequencing the data; and,
   wherein the logic device is operably connected to the sequencing processor and provides an instruction to re-sequence the data when the first modulated signal has a peak-to-average power ratio greater than the predetermined threshold.

2. The transmitter of claim 1, wherein the amplitude filter is a FIR filter.

3. The transmitter of claim 1, wherein the amplitude filter is an IIR filter.

4. The transmitter of claim 1, further comprising a sequencing processor for sequencing the data.

5. The transmitter of claim 4, wherein the sequencing processor is operably connected to the modulator to provide the data.

6. In a multi-carrier communication system, a transmitter for transmitting data with multiple carriers, comprising:
   a modulator for modulating multi-carrier symbols with the data thereby creating one or more modulated signals;
   a processor for measuring a peak-to-average power ratio of the modulated signals;
   a logic device for comparing the peak-to-average power ratio of the modulated signals with a predetermined threshold and for selecting a modulated signal based on the comparison;
   a processor for appending a data map signal associated with the selected signal to create a re-sequenced signal; and
   an amplitude filter for reducing peaks of the re-sequenced signal that are outside a predetermined range;
   a sequencing processor for sequencing the data; and,
   wherein the logic device is operably connected to the sequencing processor and provides an instruction to re-sequence the data when the first modulated signal has a peak-to-average power ratio greater than the predetermined threshold.

7. A device for transmitting data with multiple carriers, comprising:
a modulator configured to modulate multi-carrier symbols with a first sequence of data to create a first modulated signal, and a second sequence of data to create a second modulated signal; wherein the first and second sequences are not the same;
a processor configured to measure a peak-to-average power ratio of the first and second modulated signals;
a logic device configured to compare the peak-to-average power ratio of each of the modulated signals with a predetermined threshold and configured to select one of the first and second modulated signals based on the comparison;
a processor configured to append a data map to the selected modulated signal to create a re-sequenced signal, wherein the data map is reflective of the first or second sequence of data associated with the selected modulated signal; and,
an amplitude filter configured to reduce peaks of the re-sequenced signal that are outside a predetermined range.

8. The device of claim 7 wherein the amplitude filter is a FIR filter.

9. The device of claim 7 wherein the amplitude filter is an IIR filter.

10. The device of claim 7, further comprising a sequencing processor configured to create the first and second sequence of data.

11. The device of claim 10, wherein the sequencing processor is operably connected to the modulator to provide the data.

12. The device of claim 10, wherein the logic device is operably connected to the sequencing processor and configured to provide an instruction to re-sequence the first sequence of data to create the second sequence of data when the first modulated signal has a peak-to-average power ratio greater than the predetermined threshold.

13. In a multi-carrier communication system a method of transmitting data comprising:
modulating multi-carrier symbols with a first sequence of data to create a first modulated signal;
re-sequencing the first sequence of data to create a second sequence of data;
modulating the multi-carrier symbols with the second sequence of data to create a second modulated signal,
measuring the peak-to-average power ratio of the first modulated signal and measuring the peak-to-average power ratio of the second modulated signal;
comparing the peak-to-average power ratio of the first modulated signal and the peak-to-average power ratio of the second modulated signal to a predetermined threshold;
selecting the first or second modulated signal based on the comparison;
appending to the selected first or second modulated signal a data map reflective of the sequence of data associated with the selected first or second modulated signal, to thereby create an intermediate signal, and
reducing peaks of the intermediate signal that are outside a predetermined range with an amplitude filter,
wherein the steps of measuring, comparing and selecting are performed by one or more processors.

* * * * *